United States Patent
Muthuswamy

(10) Patent No.: US 10,667,274 B2
(45) Date of Patent: May 26, 2020

(54) METHOD AND SYSTEM FOR DYNAMIC CHANNEL ALLOCATION IN LONG-RANGE LAND-TO-SEA (LRLS) WIRELESS COMMUNICATION

(71) Applicant: WIPRO LIMITED, Bangalore (IN)

(72) Inventor: Sridharan Muthuswamy, San Jose, CA (US)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/022,828

(22) Filed: Jun. 29, 2018

(65) Prior Publication Data

US 2020/0008207 A1    Jan. 2, 2020

(51) Int. Cl.
| | |
|---|---|
| H04W 72/08 | (2009.01) |
| H04B 17/382 | (2015.01) |
| H04B 17/336 | (2015.01) |
| H04W 72/06 | (2009.01) |
| H04W 40/16 | (2009.01) |
| H04W 16/14 | (2009.01) |
| H04W 36/30 | (2009.01) |
| H04W 40/12 | (2009.01) |

(52) U.S. Cl.
CPC ........ *H04W 72/082* (2013.01); *H04B 17/336* (2015.01); *H04B 17/382* (2015.01); *H04W 72/06* (2013.01); *H04W 16/14* (2013.01); *H04W 36/30* (2013.01); *H04W 40/12* (2013.01); *H04W 40/16* (2013.01)

(58) Field of Classification Search
CPC ... H04W 72/082; H04W 72/06; H04W 40/16; H04W 40/12; H04W 36/30; H04W 16/14; H04B 17/336; H04B 17/382
See application file for complete search history.

(56) References Cited

U.S. PATENT DOCUMENTS

| | | | |
|---|---|---|---|
| 7,110,374 B2 | 9/2006 | Malhotra et al. | |
| 7,206,840 B2* | 4/2007 | Choi | H04W 36/06 |
| | | | 370/333 |
| 8,290,503 B2 | 10/2012 | Sadek et al. | |
| 9,055,460 B1* | 6/2015 | Kim | H04W 52/244 |

(Continued)

FOREIGN PATENT DOCUMENTS

CN    1809998 A    7/2006

*Primary Examiner* — Brian T O Connor
(74) *Attorney, Agent, or Firm* — Finnegan, Henderson, Farabow, Garrett & Dunner, LLP

(57) ABSTRACT

Disclosed herein is a method and system for dynamic channel allocation among plurality of Base Transceiver Stations (BTSs) in Long-Range Land-to-Sea (LRLS) wireless network. The method comprises configuring plurality of channels, having non-overlapping frequencies, to plurality of BTSs, and obtaining channel quality parameters related to each channel. Subsequently, an Aggregate Weighted Signal-to-Interference Noise Ratio (AWSINR) metrics and a throughput value for each of plurality of BTSs is determined based on the channel quality parameters. Finally, an optimal channel is identified among plurality of channels for allocating to each of plurality of BTSs based on the AWSINR metrics or the throughput value. In an embodiment, the present disclosure helps in eliminating interference in the LRLS wireless network, thereby optimizing network throughput and enhancing Quality of Experience to end users.

15 Claims, 4 Drawing Sheets

(56) References Cited

U.S. PATENT DOCUMENTS

| | | | |
|---|---|---|---|
| 9,055,592 B2* | 6/2015 | Clegg | H04W 72/082 |
| 9,319,916 B2* | 4/2016 | Abdelmonem | H04L 5/0026 |
| 9,860,165 B2* | 1/2018 | Zou | H04W 36/06 |
| 2011/0117967 A1* | 5/2011 | Vedantham | H04B 7/024 |
| | | | 455/561 |
| 2015/0305051 A1* | 10/2015 | Xia | H04J 3/1694 |
| | | | 370/329 |
| 2018/0316478 A1* | 11/2018 | Clegg | H04W 72/082 |

* cited by examiner

METHOD AND SYSTEM FOR DYNAMIC CHANNEL ALLOCATION IN LONG-RANGE LAND-TO-SEA (LRLS) WIRELESS COMMUNICATION

FIELD OF THE INVENTION

The present subject matter is, in general, related to Long-Range Land-to-Sea (LRLS) communication, but not exclusively, to a method and system for performing dynamic channel allocation among a plurality of Base Transceiver Stations (BTSs) in the LRLS wireless network.

BACKGROUND

Generally, Long-Range Land-to-Sea (LRLS) communication in 5 GHz unlicensed shared spectrum uses a Variable-Time-Slot Time Division Multiple Access (VTS-TDMA) method and an Automatic Repeat Request/Query (ARQ) error-control mechanism to set-up communication channels between a Base Transceiver Station (BTS) on land and Customer Premises Equipments (CPEs) in the sea or on ships. However, since the LRLS operates in the shared spectrum, quality of the channels connecting the BTS and the CPEs becomes dependent on usage of the shared spectrum by other entities such as end user devices. Also, due to increased usage of the shared spectrum in the 5 GHz hand and coexistence of other wireless entities/devices in the same frequency hand, the BTS and the CPEs are subjected to greater frequency interference. As a result, throughput and network utilization of the shared spectrum network is significantly reduced.

Further, Service Level Agreement (SLA) and quality maintenance issues may arise when the throughput of the channels drops below a threshold value, for example, 3 Mbps. The throughput may drop at smaller distances (i.e. at reduced cell edge) due to interference at the BTS and the CPEs. In such a scenario, it would be necessary to switch the channels and/or data-paths between the BTS and CPEs to an available Very Small Aperture Terminal (VSAT) network to maintain the desired SLA. However, certain network entry/re-entry events may trigger the data-paths to switch back to the LRLS network from the VSAT network. This back-and-forth switching of the data-paths is most likely to result in "flapping" (ping-pong) effect and affects overall Quality of Experience (QoE) at the CPEs. Further, any interference at the BTS and CPEs may aggravate the flapping issue post switching of channels from the VSAT to the LRLS.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of dynamic channel allocation among a plurality of Base Transceiver Stations (BTSs) in a Long-Range Land-To-Sea (LRLS) wireless network. The method comprises configuring, by a channel allocation unit, a plurality of channels, having non-overlapping frequencies, to the plurality of BTSs for communicating with one or more Customer Premises Equipments (CPEs). Further, the method comprises scanning each of the plurality of channels corresponding to each pair of the BTS and the CPEs for obtaining one or more channel quality parameters related to each of the plurality of channels. Upon obtaining the one or more channel quality parameters, the method comprises computing at least one of an Aggregate Weighted Signal-to-Interference Noise Ratio (AWSINR) metrics or channel capacity metrics for each pair of the BTS and the CPEs, across each of the plurality of channels, based on the one or more channel quality parameters. Thereafter, the method comprises determining a throughput value for the plurality of BTSs across each of the plurality of channels based on the channel capacity metrics of the corresponding channel. Finally, the method comprises identifying an optimal channel from the plurality of channels, for each of the plurality of BTSs based on at least one of the AWSINR metrics or the throughput value. The identified optimal channel is allocated to respective each of the plurality of BTSs.

Further, the present disclosure relates to a channel allocation unit for performing dynamic channel allocation among a plurality of Base Transceiver Stations (BTSs) in a Long-Range Land-To-Sea (LRLS) wireless network. The channel allocation unit comprises a processor and a memory, communicatively coupled to the processor and stores processor-executable instructions, which on execution, cause the processor to configure a plurality of channels, having non-overlapping frequencies, to the plurality of BTSs to communicate with one or more Customer Premises Equipments (CPEs). Further, the instructions cause the processor to scan each of the plurality of channels corresponding to each pair of the BTS and the CPEs to obtain one or more channel quality parameters related to each of the plurality of channels. Furthermore, the instructions cause the processor to compute at least one of an Aggregate Weighted Signal-to-Interference Noise Ratio (AWSINR) metrics or the channel capacity metrics for each pair of the BTS and the CPEs, across each of the plurality of channels, based on the one or more channel quality parameters. Thereafter, the instructions cause the processor to determine a throughput value for the plurality of BTSs across each of the plurality of channels based on the channel capacity metrics of the corresponding channel. Finally, the instructions cause the processor to identity an optimal channel from the plurality of channels, for each of the plurality of BTSs based on at least one of the AWSINR metrics or the throughput value. The identified optimal channel is allocated to respective each of the plurality of BTSs.

Furthermore, the present disclosure is related to a non-transitory computer readable medium including instructions stored thereon that when processed by at least one processor cause a channel allocation unit to perform operations comprising configuring a plurality of channels having non-overlapping frequencies to the plurality of BTSs for communicating with one or more Customer Premises Equipments (CPEs). Further, the instructions cause the channel allocation unit to scan each of the plurality of channels corresponding to each pair of the BTS and the CPEs for obtaining one or more channel quality parameters related to each of the plurality of channels. Thereafter, the instructions cause the channel allocation unit to compute at least one of an Aggregate Weighted Signal-to-interference Noise Ratio (AWSINR) metrics or channel capacity metrics for each pair of the BTS and the CPEs, across each of the plurality of channels, based on the one or more channel quality parameters. Further, the instructions cause the channel allocation unit to determine a throughput value for the plurality of BTSs across each of the plurality of channels based on the channel capacity metrics of the corresponding channel. Finally, the instructions cause the channel allocation unit to identify an optimal channel, from the plurality of channels, for each of the plurality of BTSs based on at least one of the AWSINR metrics or the throughput value, wherein the identified optimal channel is allocated to respective each of the plurality of BTSs.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
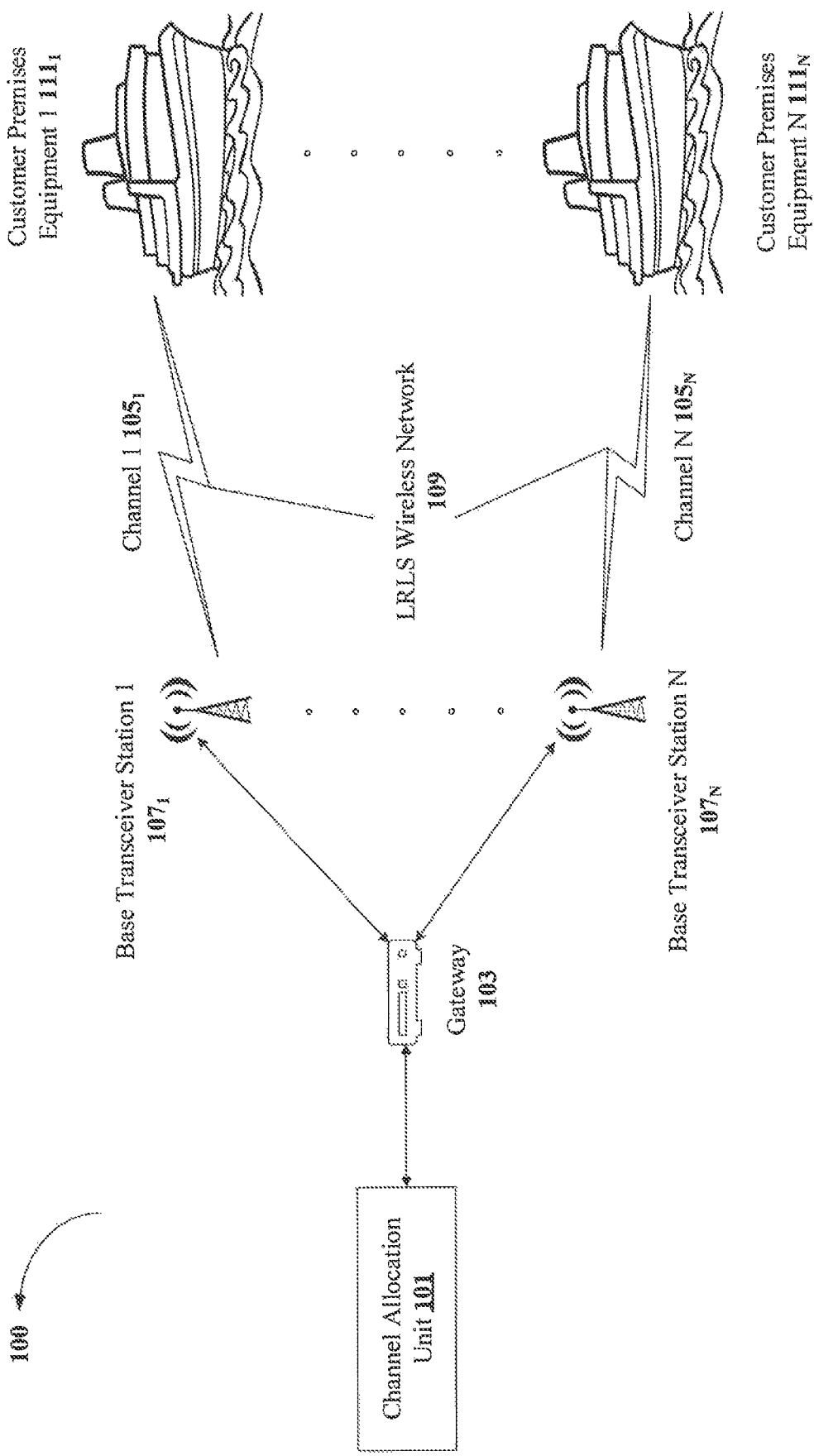
FIG. 1 illustrates an exemplary environment for dynamically allocating channels among a plurality of Base Transceiver Stations (BTSs) in a Long-Range Land-to-Sea (LRLS) wireless network in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a channel allocation unit for dynamically allocating channels among a plurality of Base Transceiver Stations (BTSs) in a Long-Range Land-To-Sea (LRLS) wireless network. In an embodiment, the present disclosure discloses a robust interference avoidance mechanism in the LRLS communication in a shared spectrum network. The proposed mechanism helps in maximizing throughput or QoS (Quality of Service) and maintaining Service Level Agreement (SLA) requirements of the LRLS communication. Further, the instant disclosure also discloses a mechanism for mitigating "flapping" or "ping-pang" effect in the LRLS network, thereby maintaining Quality of Experience (QoE) for end users.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for dynamically allocating plurality of channels 105 among a plurality of Base Transceiver Stations (BTSs) 107 in a Long-Range Land-to-Sea (LRLS) wireless network 109 in accordance with some embodiments of the present disclosure.

The environment 100 includes a channel allocation unit 101, a gateway 103, a plurality of Base Transceiver Stations namely, Base Transceiver Station 1 $107_1$ to Base Transceiver Station N $107_N$ (collectively referred as Base Transceiver Stations 107) and one or more Customer Premises Equipments (CPEs) namely, Customer Premises Equipment 1 $111_1$ to Customer Premises Equipment N $111_N$ (collectively referred as Customer Premises Equipments 111) connected to the plurality of BTSs 107. In an implementation, the CPEs 111 may be connected to the plurality of BTSs 107 using a plurality of channels namely, channel 1 $105_1$ to channel N $105_N$ (collectively referred as plurality of channels 105), in the LRLS wireless network 109. The LRLS wireless network 109 may be established between the plurality of BTSs 107 and the CPEs 111. In an implementation, the gateway 103 may be a network gateway or a router, which facilitates connection between the channel allocation unit 101 and the plurality of BTSs 107.

In an embodiment, the channel allocation unit 101 may be configured for dynamically allocating the plurality of channels 105 among the plurality of BTSs 107, such that each of the plurality of BTSs 107 are configured with a non-overlapping frequency at any point of time. In some implementations, the channel allocation unit 101 may be configured as a plugin to a network management system (not shown in figures) associated with an external wired network.

The one or more CPEs 111 may include, without limiting to, mobile phones, computers/laptops, Personal Digital Assistants (PDAs), and other electronic devices, which are capable of connecting to the LRLS wireless network 109 using the plurality of channels 105. In the LRLS communication scenario, the plurality of BTSs 107 may be deployed on the land and/or shores of the sea and may extend wireless network connectivity to the one or more CPEs 111 through the LRLS wireless network 109. The one or more CPEs 111 may be present in the sea, i.e. on ships, boats or other water-borne vehicles.

In an embodiment, the channel allocation unit 101 may configure the plurality of channels 105, having non-overlapping frequencies, to the plurality of BTSs 107 for communicating with the one or more CPEs 111. Thereafter, the channel allocation unit 101 may send commands to the BTSs 107 to scan each of the plurality of channels 105 corresponding to each pair of the BTS 107 and the CPEs 111 to obtain one or more channel quality parameters related to each of the plurality of channels 105. As an example, the one or more channel quality parameters may include, without limiting to, at least one of a downlink Aggregate Weighted Signal-to-Interference Noise Ratio (AWSINR) of each of the plurality of channels 105, an uplink AWSINR of each of the plurality of channels 105, buffer size of each of the plurality of channels 105, downlink channel capacity of each of the plurality of channels 105, and uplink channel capacity of each of the plurality of channels 105.

In an embodiment, upon receiving the one or more channel quality parameters, the channel allocation unit 101 may compute at least one of AWSINR metrics or channel capacity metrics for each pair of the BTS 107 and the CPEs 111, across each of the plurality of channels 105. Subsequently, the channel allocation unit 101 may determine a throughput value for the plurality of BTSs 107 across each of the plurality of channels 105 based on the channel capacity metrics of the corresponding channel. Finally, the channel allocation unit 101 may identify an optimal channel, among the plurality of channels 105, for each of the plurality of BTSs 107 based on at least one of the AWSINR metrics or the throughput value. In an embodiment, the channel allocation unit 101 may allocate each of the identified optimal channel to the respective plurality of BTSs 107, thereby ensuring that each of the plurality of BTSs 107 are configured with optimal channels having non-overlapping frequencies.

Figure 2:
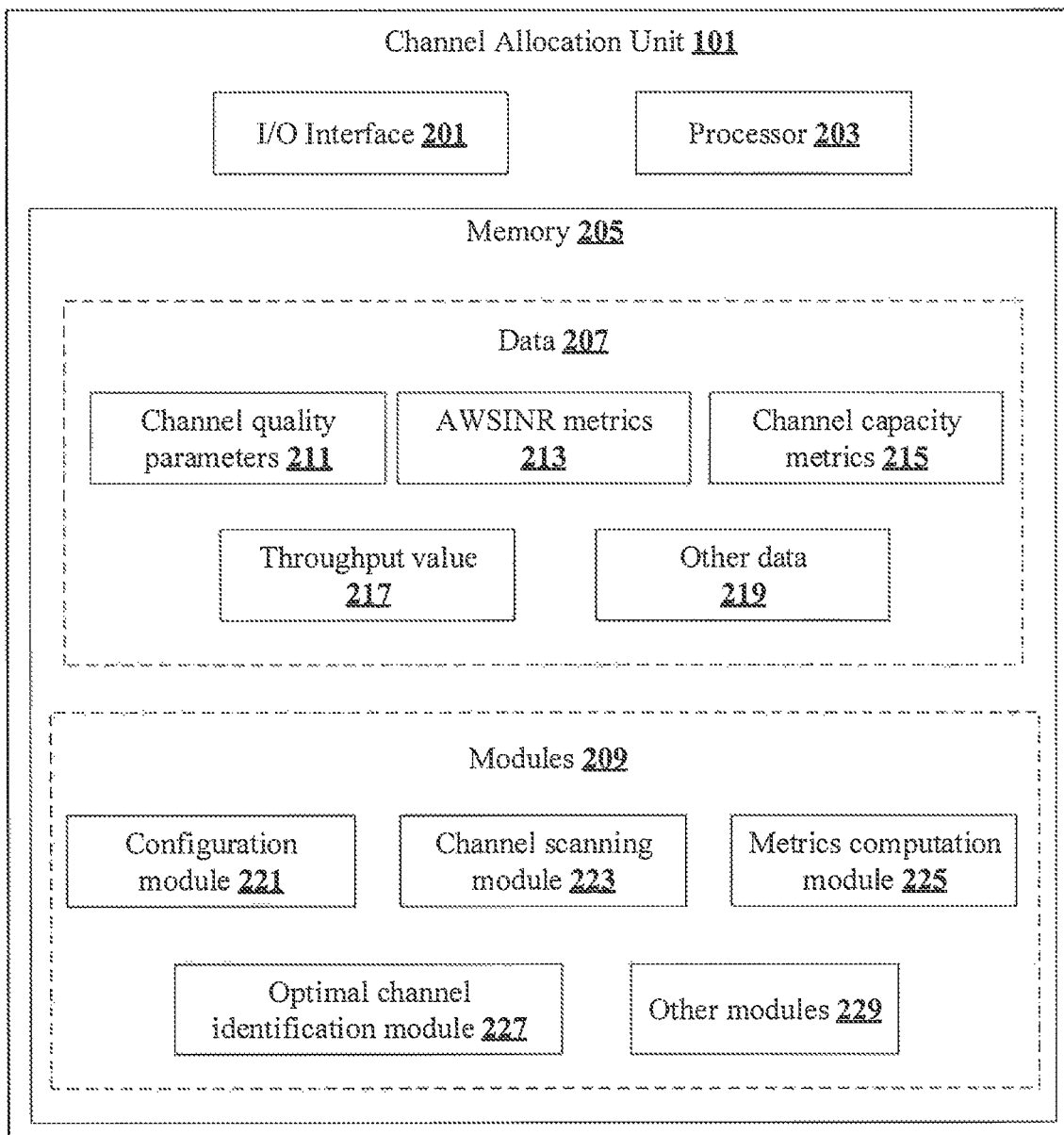
FIG. 2 shows a detailed block diagram illustrating a channel allocation unit in accordance with some embodiments of the present disclosure.

FIG. 2 shows a detailed block diagram illustrating a channel allocation unit 101 in accordance with some embodiments of the present disclosure.

In some implementations, the channel allocation unit 101 may include an I/O interface 201, a processor 203, and a memory 205. The I/O interface 201 may be configured to obtain one or more channel quality parameters 211 related to each of plurality of channels 105 configured to the plurality of BTSs 107. The processor 203 may be configured to perform one or more functions of the channel allocation unit 101 while performing dynamic channel allocation among the plurality of BTSs 107.

In some implementations, the memory 205 may be communicatively coupled to the processor 203 and may store data 207 and one or more modules 209. In an embodiment, the data 207 may include, without limiting to, channel quality parameters 211, Aggregate Weighted Signal-to-Interference Noise Ratio (AWSINR) metrics 213, channel capacity metrics 215, throughput value 217 and other data 219.

In some embodiments, the data 207 may be stored within the memory 205 in the form of various data structures. Additionally, the data 207 may be organized using data models, such as relational or hierarchical data models. The other data 219 may store all temporary data and files generated by the one or more modules 209 while performing various functions of the channel allocation unit 101.

In an embodiment, the channel quality parameters 211 may be obtained by scanning each of the plurality of channels 105 corresponding to each pair of the BTS 107 and the CPEs 111. As an example, the one or more channel quality parameters 211 comprise at least one of a downlink AWSINR of each of the plurality of channels 105, an uplink AWSINR of each of the plurality of channels 105, buffer size of each of the plurality of channels 105, downlink channel capacity of each of the plurality of channels 105, and uplink channel capacity of each of the plurality of channels 105. In some implementations, the channel quality parameters 211 may be obtained at predetermined regular intervals, for example at every 10 seconds, in order to constantly monitor and record variations in each of the plurality of channels 105.

In an embodiment, the AWSINR metrics 213 may be computed for each pair of the BTS 107 and the CPEs 111 across each of the plurality of channels 105 based on the one or more channel quality parameters 211. As an example, the AWSINR of a channel may be computed as a sum of downlink AWSINR and uplink AWSINR of the channel, normalized to buffer size of the channel as shown in equation (1) below:

$$AWSINR_{channel} = (\Sigma AWSINR_{ul\text{-}channel} + AWSINR_{dl\text{-}channel})/2 * L \quad (1)$$

Wherein,
$AWSINR_{channel}$ is combined AWSINR of the channel
$AWSINR_{ul\text{-}channel}$ is Uplink AWSINR of the channel
$AWSINR_{dl\text{-}channel}$ is Downlink AWSINR of the channel
'L' is the length of the cyclic buffer used to store the AWSINR samples.

As an example, the AWSINR metrics 213 for BTS 'A' across a channel 'j' may be determined using equation (2) below:

$$T_{Aj} = \Sigma S_{ij} \quad (2)$$

Wherein,
'$\Sigma S_{ij}$' is the combined normalized AWSINR metrics 213 for the channel 'j' across all the CPEs denoted by 'i'.

In an embodiment, the channel capacity metrics 215 may be computed for each pair of the BTS 107 and the CPEs 111 across each of the plurality of channels 105 based on the one or more channel quality parameters 211. As an example, the channel capacity metrics 215 of a channel may be computed as a sum of downlink channel capacity metrics 215 and uplink channel capacity metrics 215 of the channel as indicated in equation (3) below:

$$C_{channel} = C_{ul} + C_{dl} \quad (3)$$

Wherein, $C_{channel}$ is combined channel capacity of the channel $C_{ul}$—uplink channel capacity of the channel $C_{dl}$—downlink channel capacity of the channel Further, values of '$C_{ul}$' and the '$C_{dl}$' may be computed using the equations (4) and (5) below:

$$C_{ul}=1/N(\Sigma T_{ul}[\text{mcs}]*r\text{Stats}_{ul}[\text{mcs}]) \quad (4)$$

$$C_{dl}=1/N(\Sigma T_{dl}[\text{mcs}]*r\text{Stats}_{dl}[\text{mcs}]) \quad (5)$$

Wherein,

'N' is number of link adaptation probes/messages sent through the channel

'$T_{ul}$[mcs]' is the optimal throughput value 217 that can be achieved on the uplink channel for a given Modulation and Coding Scheme (MCS)

'$T_{dl}$[mcs]' is the optimal throughput value 217 that can be achieved on the downlink channel for the given MCS.

'$r\text{Stats}_{ul}$[mcs]' and '$r\text{Stats}_{dl}$[mcs]' are the probe statistics received over the uplink channel and the downlink channel, respectively for the given MCS.

In an embodiment, the throughput value 217 for the plurality of BTSs 107 across each of the plurality of channels 105 may be determined based on the channel capacity metrics 215 of the corresponding channel. As an example, the throughput value 217 for BTS 'A' across a channel 'j' may be determined using equation (6) below:

$$T_{Aj}=\Sigma Cij \quad (6)$$

Wherein,

'$\Sigma Cij$' is the combined channel capacity metrics 215 for the channel 'j' across all the CPEs denoted by 'i'.

In an embodiment, each of the data 207 may be processed by the one or more modules 209 of the channel allocation unit 101. In one implementation, the one or more modules 209 may be stored in the memory 205 and communicatively coupled to the processor 203. In another implementation, the one or more modules 209 may be configured as a part of the processor 203. In an implementation, the one or more modules 209 may include, without limiting to, a configuration module 221, a channel scanning module 223, a metrics computation module 225, an optimal channel identification module 227, and other modules 229.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 229 may be used to perform various miscellaneous functionalities of the channel allocation unit 101. It will be appreciated that the one or more modules 209 may be represented as a single module or a combination of different modules.

In an embodiment, the configuration module 221 may be used for configuring a plurality of channels 105, having non-overlapping frequencies, to the plurality of BTSs 107 for communicating with the one or more CPEs 111. Initially, the configuration module 221 may analyze various information obtained by performing a frequency scan of the LRLS wireless network 109 on 5 GHz shared spectrum network. Further, based on the analysis, the configuration module 221 may derive insights into the plurality of BTSs 107 and the plurality of channels 105 associated with them, by collecting information related to each of the plurality of BTSs 107. As an example, the information collected by the configuration module 221 may include signal strength and Radio Frequency (RF) activity around the plurality of BTSs 107, and information required to minimize possibility of co-channel, overlapping channel and non-Wi-Fi interference at the plurality of BTSs 107. Thereafter, the configuration module 221 may identify maximum number of channels having minimal interference in the LRLS wireless network 109. Finally, the configuration module 221 may configure each of the plurality of BTSs 107 with the identified channels, such that every adjacent BTS 107 among the plurality of BTSs 107 are on the non-overlapping frequencies.

In an embodiment, the channel scanning module 223 may be used for scanning each of the plurality of channels 105 corresponding to each pair of the BTS 107 and the CPEs 111 for obtaining one or more channel quality parameters 211 related to each of the plurality of channels 105. Initially, the channel scanning module 223 may fetch from each of the plurality of BTSs 107 initial operating frequencies of each of the plurality of BTSs 107. Thereafter, the channel scanning module 223 may iteratively fetch from each of the plurality of BTSs 107 on each of the available non-overlapping frequencies to obtain the channel quality parameters 211 related to each of the plurality of channels 105.

For example, suppose there are 'M' channels, having non-overlapping frequencies {f1, f2, . . . fM}, available for allocating to a plurality of BTSs 107. Further, suppose every BTSi among the plurality of BTSs 107 has 'N' other neighboring BTSs, such that (1≤N≤M−1) and each of the plurality of BTSs 107 are on non-overlapping frequencies. With the above consideration, for M=9 and N=4, initial operating frequencies for the plurality of BTSs 107 may be as indicated by highlighted boxes in Table 1 below:

TABLE 1

| | Initial operating frequencies for the BTSs | | | | | | | | |
|---|---|---|---|---|---|---|---|---|---|
| BTS\F | f1 | f2 | f3 | f4 | f5 | f6 | f7 | f8 | f9 |
| BTS1 | f1 | | | | | | | | |
| BTS2 | | | f3 | | | | | | |
| BTS3 | | | | | | f6 | | | |
| BTS4 | | | | | | | f7 | | |
| BTS5 | | | | | | | | | f9 |

In an embodiment, upon collecting the initial operating frequencies of each of the plurality of BTSs 107, the channel scanning module 223 may scan each of the plurality of channels 105 using the scanning mechanism illustrated below:

Initialize A[k−1]=index of operating frequency for BTSk;

for all j in 1 to M, for all k in 0 to N, $$\text{perform } A[k]=(A[k])\text{mod}(M)+1 \quad (5)$$

Wherein,

'A[k]' is a frequency array storing frequencies for BTS 'k', 1≤k≤(N+1)

'M' is the number of frequencies

'N' is number of neighboring BTSs of the BTS 'k'

For example, for M=9, N=4 and k=1, an operating frequency for the BTS1 at first level scan (denoted by Scan 1) may be determined using the equation (5) as illustrated below:

$$\text{Operating frequency for } BTS\ 1 = A[1]$$
$$= (A[1])\mod(M) + 1$$
$$\text{(initial operating frequency}$$
$$\text{of } BTS1)\mod(9) + 1$$
$$= 1 \mod 9 + 1$$
$$= 2$$

Similarly, an operating frequency for the BTS2 at second level scan (denoted by Scan 2) may be determined using the equation (5) as illustrated below:

$$\text{Operating frequency for } BTS\ 2 = A[2]$$
$$= (A[2])\mod(M) + 1$$
$$\text{(operating frequency}$$
$$\text{of } BTS2 \text{ at scan 1)}$$
$$\mod(9) + 1$$
$$= 4 \mod 9 + 1$$
$$= 5$$

Likewise, the channel scanning module 223 may scan each of the plurality of BTSs 107 and their corresponding plurality of channels 105 to determine the operating frequencies of each of the plurality of BTSs 107 as shown in Table 2 below:

TABLE 2

Frequency scan of each of the plurality of BTSs over each of the plurality of channels

| Scan iteration | BTS5 | BTS4 | BTS3 | BTS2 | BTS1 |
|---|---|---|---|---|---|
| Initial operating frequencies | 9 | 7 | 6 | 3 | 1 |
| Scan 1 | 1 | 8 | 7 | 4 | 2 |
| Scan 2 | 2 | 9 | 8 | 5 | 3 |
| Scan 3 | 3 | 1 | 9 | 6 | 4 |
| Scan 4 | 4 | 2 | 1 | 7 | 5 |
| Scan 5 | 5 | 3 | 2 | 8 | 6 |
| Scan 6 | 6 | 4 | 3 | 9 | 7 |
| Scan 7 | 7 | 5 | 4 | 1 | 8 |
| Scan 8 | 8 | 6 | 5 | 2 | 9 |
| Final | 9 | 7 | 6 | 3 | 1 |

In an embodiment, the channel scanning module 223 may scan the plurality of channels 105 at predetermined intervals. Suppose, the operating frequency for a given BTS 107 is $f_0$. Here, the BTS 107 may periodically signal its corresponding CPE for a frequency scan procedure by setting a flag in a Time-Division Duplex (TDD) message being exchanged between the BTS 107 and the CPE. Additionally, the BTS 107 may also communicate the frequency to be scanned 'fj' (such that $fj \neq f_o$) to the CPE. This would ensure that any new CPE, wanting to join the BTS 107 network, is refrained from establishing a connection with the BTS 107, since the TDD flag is already set. For example, if the number of CPEs 111 connected to the BTS 107 is 'K', then, when the BTS 107 changes its frequency to 'fj', all "K" CPEs may change their operating frequencies to 'fj' in a TDMA round-robin fashion. This may ensure that there are no overlapping frequencies among any pair of BTS 107 and the CPEs 111.

In an embodiment, metrics computation module 225 may be used for computing at least one of the AWSINR metrics 213 or the channel capacity metrics 215 for each pair of the BTS 107 and the CPEs 111, across each of the plurality of channels 105 (identified in Table 2), based on the one or more channel quality parameters 211.

Computation of AWSINR:

In an embodiment, the SINR of a channel may be directly correlated to the throughput of the channel. Therefore, maximizing the SINR may maximize the throughput of the channel. Hence, determining the AWSINR of the plurality of channels 105 for each pair of the BTS 107 and the CPEs 111 may be crucial for determining the throughput of each of the plurality of channels 105.

In an embodiment, for a given CPEi, the uplink and downlink SINR metrics may be aggregated at the BTS 107 for a frequency 'fj'. For example, once the BTS 107 and the CPEi exchange a pre-determined number of statistics packets, the CPEi may compute the downlink SINR from the packets. As an example, the statistics packets may be Medium Access Control Protocol Data Units (MAC PDUs) with dummy payloads. Subsequently, upon computing the downlink SINR, the CPEi may transmit the downlink SINR to the BTS 107 in the uplink TDD (or at the end of downlink transmission). Thereafter, the BTS 107 may extract the downlink SINR metrics and buffer them. Similarly, the BTS 107 may compute the uplink SINR from the uplink packets received from the CPEi and buffer them. Subsequently, the AWSINR metrics 213 may be computed for both the buffers and subjected to a cell edge detection logic. If a cell edge is detected in the uplink or in the downlink, then the combined AWSINR for CPEi may be set to 0. On the other hand, if the cell edge is not detected, then the combined AWSINR may be set as a sum of uplink AWSINR and downlink AWSINR, normalized by the buffer size 'L' of the channel, as indicated in equation (1).

i.e. $AWSINR_{channel}(S) = (\Sigma AWSINR_{ul\text{-}channel} + AWSINR_{dl\text{-}channel})/2*L$ In an embodiment, each of the plurality of BTSs 107 may store the AWSINR metrics 213 for each of the one or more CPEs 111 connected to them, as shown in the Table 3 below. Subsequently, the plurality of BTSs 107 may refer to the computed AWSINR metrics at every 'Td' seconds to monitor channel distribution to the one or more CPEs 111.

TABLE 3

AWSINR metrics for BTS1 over frequencies f1-f9

| BTS1 | f1 | f2 | f3 | f4 | f5 | f6 | f7 | f8 | f9 |
|---|---|---|---|---|---|---|---|---|---|
| CPE1 | S11 | S12 | S13 | S14 | S15 | S16 | S17 | S18 | S19 |
| CPE2 | 0 | S22 | S23 | S24 | S25 | 0 | S27 | S28 | S29 |
| CPE3 | S31 | S32 | S33 | 0 | S35 | S36 | S37 | S38 | S39 |
| Σ | T11 | T12 | T13 | T14 | T15 | T16 | T17 | T18 | T19 |

Here, 'Sij' denotes the combined AWSINR for BTS1 connected to the CPEi over the frequency 'fj'. 'T1j' denotes the combined normalized AWSINR for BTS1 over the frequency 'fj' across each of the 'K' CPEs.

i.e. $T1j = \Sigma Sij$, for all $1 \leq i \leq K$

For example, combined AWSINR for BTS1 on frequency 1 may be computed as T11=S11+S21+S31, when the BTS1 is connected to CPE1, CPE2 and CPE3.

Computation of Channel Capacity:

In an embodiment, for a given CPEi, i.e., a pair of (BTS, CPEi), the channel capacity on a frequency 'fj' may be computed as the sum of uplink channel capacity for CPEi over 'fj' and downlink channel capacity for CPEi over 'fj', as illustrated in equations (3), (4) and (5). In an embodiment, the metrics computation module 225 may validate both the uplink channel capacity and the downlink channel capacity against a required Service Level Agreement (SLA) to determine if both the uplink channel and the downlink channel satisfy the required SLA. For example, the SLA requirement may be that, both the uplink channel and the downlink channel must have a channel capacity of more than 3 Mbps.

In such a scenario, if the SLA is not satisfied by either the uplink channel or the downlink channel, then the frequency 'fj' may be considered as not qualified for allocation and the combined channel capacity for 'fj' may be set to 0. However, if the SLA requirement is satisfied by both the uplink channel and the downlink channel, then the metrics computation module 225 may compute the combined channel capacity (C) for 'fj' using the equation (3). Further, the channel capacity metrics 215 for each of the plurality of BTSs 107, corresponding to each of the one or more CPEs 111, may be computed and stored at each of the plurality of BTSs 107 as shown in Table 4.

TABLE 4

AWSINR metrics for BTS1 over frequencies f1-f9

| BTS1 | f1 | f2 | f3 | f4 | f5 | f6 | f7 | f8 | f9 |
|------|-----|-----|-----|-----|-----|-----|-----|-----|-----|
| CPE1 | C11 | 0   | C13 | C14 | C15 | C16 | 0   | C18 | C19 |
| CPE2 | C21 | C22 | C23 | C24 | C25 | C26 | C27 | C28 | 0   |
| CPE3 | C31 | C32 | C33 | C34 | C35 | C36 | C37 | C38 | C39 |
| Σ    | T11 | T12 | T13 | T14 | T15 | T16 | T17 | T18 | T19 |

Here, 'Cij' denotes the combined channel capacity for BTS1 connected to the CPEi over the frequency 'fj'. 'T1j' denotes the throughput for BTS1 over the frequency 'fj' across each of the 'K' CPEs.

i.e. $T1j = \Sigma Cij$, for all $1 \leq i \leq K$

For example, the throughput value 217 for BTS1 on frequency 4 may be computed as: T14=C14+C24+C34, when the BTS1 is connected to CPE1, CPE2 and CPE3.

In an embodiment, the optimal channel identification module 227 may be used for identifying an optimal channel for each of the plurality of BTSs 107 based on at least one of the AWSINR metrics 213 or the throughput value 217. Initially, the optimal channel identification module 227 may extract values of Tkj, i.e., the combined AWSINR metrics 213 or the throughput values 217, corresponding to each BTSk on a frequency 'fj', from the respective BTSs. Subsequently, the optimal channel identification module 227 may sort each of the plurality of BTSs 107 based on extracted values of Tkj, such that each pair (i, j) of the BTS 107 and the corresponding channel are unique and the ΣTij for the pair (i, j) is maximized.

As an example, sorting of each pair of the BTS 107 and the corresponding channels 105 may be performed using merge sort technique as illustrated in the below steps:
1. Perform a merge sort of each element in the array: {T(1,), T(2,), T(3,), . . . , T(B,)} in a predetermined sorting order and obtain a sorted array 'SA'.
Wherein, 'T(i,)' denotes at least one of the AWSINR metrics 213 or the throughput value 217 corresponding to each pair of the BTS 107 and the corresponding channel. 'B' denotes the number of BTSs 107 available.
2. Maintain distinct arrays, BA of size B (representing the plurality of BTSs 107) and FA, of size M (representing the plurality of channels 105), initialized to 0.
3. In the sorted array SA, let (bts_id, freq_id)=(xi, yi) for index=i.

Initialize index=0 and rank=1 for a loop over the length of SA:

```
if BA[xi] or FA[yi] is ≠ 0,
    increment index
        fetch (xi, yi) at the new index
else
    BA[xi]=FA[yi]=rank
    increment rank
``` if a rank has been assigned to all the BTSs 'B', then exit the loop.
4. Assign frequency FA[i] to BTS BA[i] for all the BTS 'B' in SA, and
5. Transmit frequency switch-over commands to each of the 'B' BTSs with an updated frequency list for each pair of the BTS and the corresponding channel.

For example, suppose the Tij metrics (i.e. either the AWSINR metrics 213 or the throughput value 217) for BTS1-BTS5 over frequencies f1-f5 may be as indicated in Table 5 below:

TABLE 5

Tij metrics for the BTSs

| BTS  | f1 | f2 | f3 | f4 | f5 |
|------|----|----|----|----|----|
| T(1,)| 15 | 17 | 22 | 12 | 9  |
| T(2,)| 16 | 12 | 11 | 24 | 13 |
| T(3,)| 12 | 12 | 13 | 13 | 19 |
| T(4,)| 17 | 16 | 11 | 12 | 28 |
| T(5,)| 11 | 11 | 10 | 10 | 22 |

Further, upon sorting each of the plurality arrays in the metrics using the merge sort technique illustrated above, the sorted array SA may be as shown in Table 6 below:

TABLE 6

Sorted array, SA

| (bts_id, freq_id) | T  |
|-------------------|-----|
| (4, 5)            | 28 |
| (2, 4)            | 24 |
| (1, 3)            | 22 |
| (5, 5)            | 22 |
| (1, 5)            | 19 |
| (3, 5)            | 19 |
| (1, 2)            | 17 |
| (4, 1)            | 17 |
| (2, 1)            | 16 |
| (4, 2)            | 16 |
| (1, 1)            | 15 |
| (2, 5)            | 13 |
| (3, 3)            | 13 |
| (3, 4)            | 13 |
| (1, 4)            | 12 |
| (2, 2)            | 12 |
| (3, 1)            | 12 |
| (3, 2)            | 12 |
| (4, 4)            | 12 |
| (2, 3)            | 11 |
| (4, 3)            | 11 |
| (5, 1)            | 11 |
| (5, 2)            | 11 |
| (5, 3)            | 10 |
| (5, 4)            | 10 |

Here, since the pair (4, 5) representing BTS4 and its corresponding channel, channel 5 has the maximum value of Tij, i.e. 28, the pair (4, 5) may be arranged as the first element in the sorted array. In an embodiment, upon sorting each pair of the BTS 107 and the corresponding channel, the optimal channel identification module 227 may rank each of the plurality of BTSs 107 (in the array BA) and each of the plurality of channels 105 (in the array FA) based on order of sorting in the sorted array SA. The ranking assigned to each of the plurality of BTSs 107 and each of the plurality of channels 105 based on the sorted array of Table 6 may be as shown in Table 7:

TABLE 7

Ranking of the BTSs and the Channels

| Index | 1 | 2 | 3 | 4 | 5 |
|---|---|---|---|---|---|
| BA Rank | 3 | 2 | 4 | 1 | 5 |
| FA Rank | 4 | 5 | 3 | 2 | 1 |

Here, for example, the BTS4 and the frequency f5 may be assigned with rank 1 since the BTS4 over the frequency f5 has resulted in the maximum Tij of 28, and their corresponding indices are registered in the BA Rank and FA Rank array as 1. Similarly, BTS2 and the frequency f4 may be assigned with rank 2, since the BTS2 over the frequency f4 has a Tij of 24, which is ordered as the second element in the sorted array SA and their corresponding indices are registered in the BA Rank and FA Rank array as 2. Likewise, each of the plurality of BTSs 107 and corresponding each of the plurality of channels 105 (or frequencies) are ranked, such that the value of Tij is maximized and none of the plurality of BTSs 107 or the plurality of channels 105 are repeated during the ranking.

In an embodiment, upon ranking each of the plurality of BTSs 107 and corresponding each of the plurality of channels 105, the optimal channel identification module 227 may identify an optimal channel for each of the plurality of BTSs 107 based on the ranking of each of the plurality of channels 105. As an example, the optimal channels identified for each of the BTSs: BTS1-BTS5 from the above example may be as indicated in Table 8 below:

TABLE 8

Allocation of optimal channels to the BTSs

| BTS | Channel/Frequency | Rank |
|---|---|---|
| BTS4 | f5 | 1 |
| BTS2 | f4 | 2 |
| BTS1 | f3 | 3 |
| BTS3 | f1 | 4 |
| BTS5 | f2 | 5 |

Here, channel 'f5' may be identified as the optimal channel for BTS4 since the pair (BTS4, f5), i.e., BTS4 on channel f5, has the highest rank among other pairs of the BTSs and the corresponding channels. Thus, BTS4 may be allocated with channel 'f5'. Likewise, the optimal channels for each of the plurality of BTSs 107 are identified and allocated for ensuring that none of the plurality of BTSs 107 are on the overlapping frequencies.

In an embodiment, the process of identifying the optimal channels for each of the plurality of BTSs 107 may be performed at predetermined regular intervals to ensure that none of the plurality of BTSs 107 use the overlapping frequencies, thereby eliminating interference at each of the plurality of BTSs 107.

Figure 3:
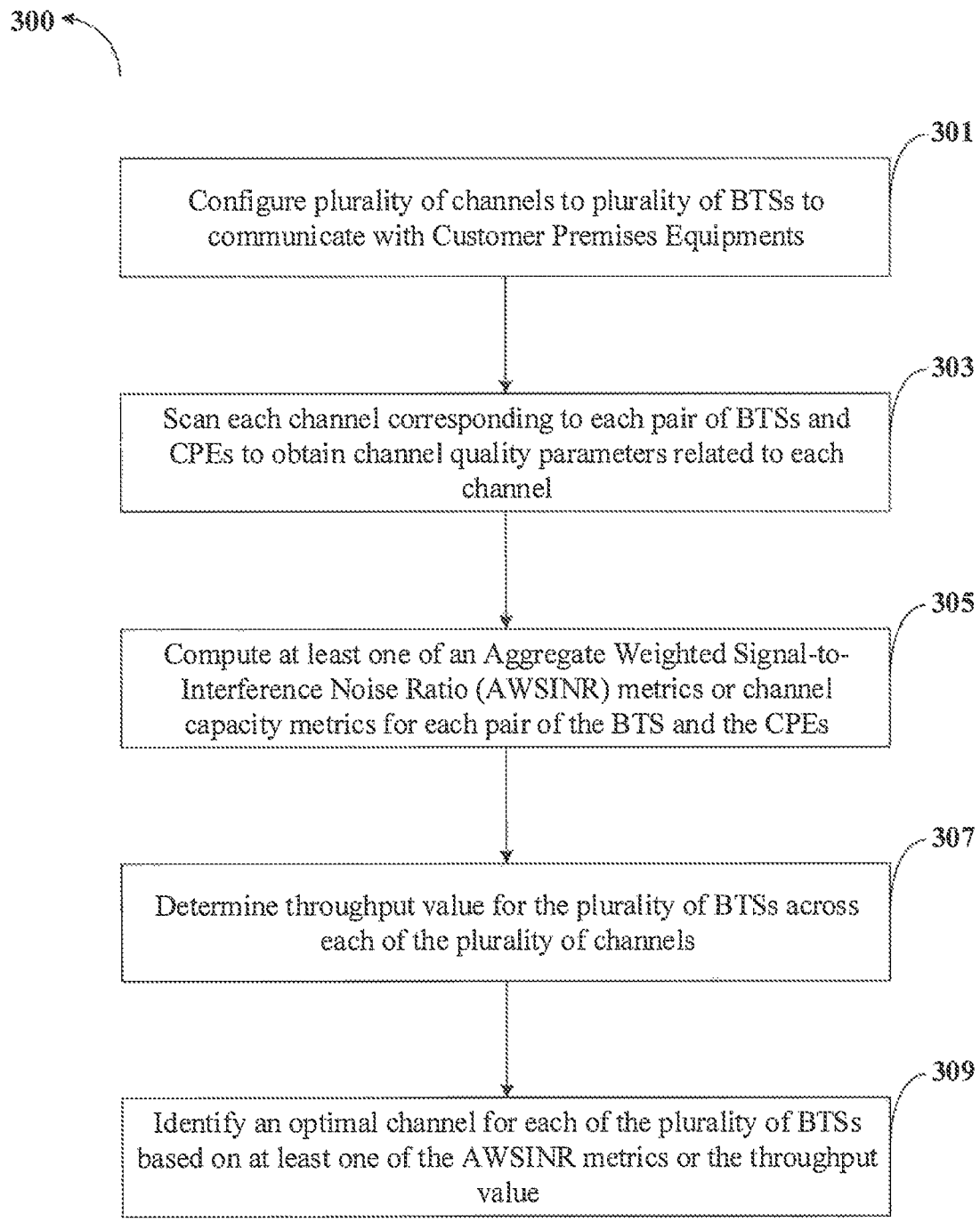
FIG. 3 shows a flowchart illustrating a method of dynamic channel allocation among a plurality of Base Transceiver Stations (BTSs) in a Long-Range Land-To-Sea (LRLS) wireless network in accordance with some embodiments of the present invention.

FIG. 3 shows a flowchart illustrating a method of dynamic channel allocation among a plurality of Base Transceiver Stations (BTSs) in a Long-Range Land-To-Sea (LRLS) wireless network 109 in accordance with some embodiments of the present invention.

As illustrated in FIG. 3, the method 300 may include one or more blocks illustrating the method of dynamically allocating plurality of channels 105 among a plurality of BTSs 107 in the LRLS wireless network 109 using a channel allocation unit 101 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes configuring, by the channel allocation unit 101, a plurality of channels 105 to the plurality of BTSs 107 for communicating with one or more Customer Premises Equipments (CPEs) 111. In an embodiment, the plurality of channels 105 configured to the plurality of BTSs 107 may have non-overlapping frequencies.

At block 303, the method 300 includes scanning, by the channel allocation unit 101, each of the plurality of channels 105 corresponding to each pair of the BTS and the CPEs 111 for obtaining one or more channel quality parameters 211 related to each of the plurality of channels 105. As an example, the one or more channel quality parameters 211 may include, without limiting to, at least one of a downlink AWSINR of each of the plurality of channels 105, an uplink AWSINR of each of the plurality of channels 105, buffer size of the AWSINR metrics of each of the plurality of channels 105, downlink channel capacity of each of the plurality of channels 105, and uplink channel capacity of each of the plurality of channels 105.

At block 305, the method 300 includes computing, by the channel allocation unit 101, at least one of an Aggregate Weighted Signal-to-Interference Noise Ratio (AWSINR) metrics 213 or channel capacity metrics 215 for each pair of the BTS and the CPEs 111, across each of the plurality of channels 105, based on the one or more channel quality parameters 211. In an embodiment, the AWSINR metrics 213 may be computed as a sum of downlink AWSINR and uplink AWSINR of each of the plurality of channels 105, normalized to buffer size of the AWSINR metrics of each of the plurality of channels 105. In an embodiment, the channel capacity metrics 215 may be computed as a sum of downlink channel capacity and uplink channel capacity of each of the plurality of channels 105. In some implementations, the AWSINR metrics 213 and the channel capacity metrics 215 may be computed at predetermined regular intervals based on the one or more channel quality parameters 211 obtained at the predetermined regular intervals.

At block 307, the method 300 includes determining, by the channel allocation unit 101, a throughput value 217 for the plurality of BTSs 107 across each of the plurality of channels 105 based on the channel capacity metrics 215 of the corresponding channel. In an embodiment, the throughput may be determined by computing the combined channel capacity of each of the plurality of channels 105.

At block 309, the method 300 includes identifying, by the channel allocation unit 101, an optimal channel, from the plurality of channels 105, for each of the plurality of BTSs 107 based on at least one of the AWSINR metrics 213 or the throughput value 217. Finally, the identified optimal channel may be allocated to respective each of the plurality of BTSs 107. In an embodiment, identifying the optimal channel for each of the plurality of BTSs 107 comprises ranking each of the plurality of BTSs 107 and corresponding plurality of channels 105 based on at least one of the AWSINR or the throughput value 217, and identifying one of the plurality of channels 105, having highest rank, as the optimal channel for the respective each of the plurality of BTSs 107.

Computer System

Figure 4:
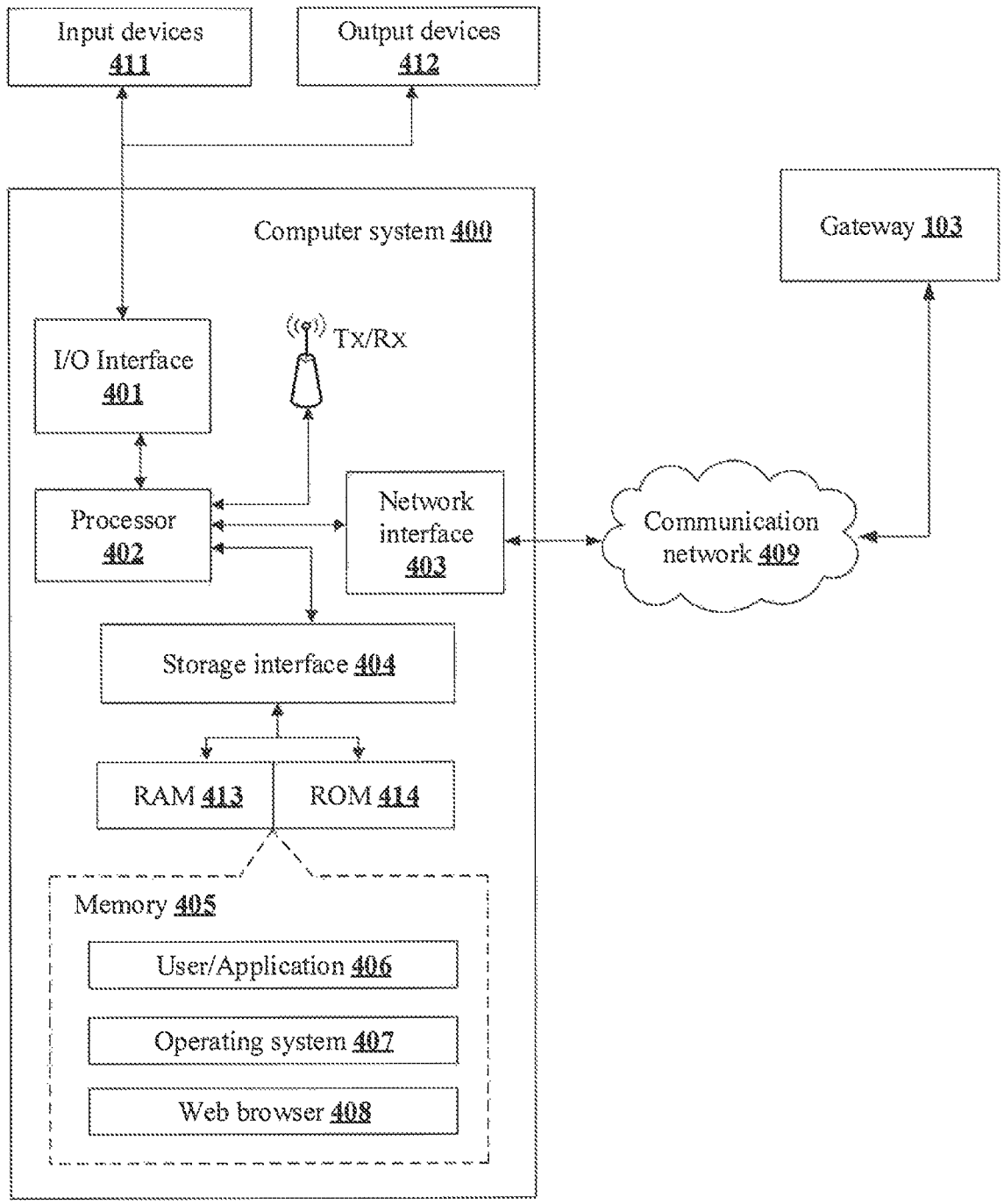
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be channel allocation unit 101 shown in FIG. 1, which may be used for performing dynamic channel allocation among a plurality of Base Transceiver Stations (BTSs) in a Long-Range Land-to-Sea (LRLS) wireless network 109. The computer system 400 may include a central processing unit ("CPU" or "processor") 402. The processor 402 may comprise at least one data processor for executing program components for executing user- or system-generated business processes. A user may include a person, a user in the computing environment 100, or any system/sub-system being operated parallelly to the computer system 400. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 403 and the communication network 409, the computer system 400 may obtain one or more channel quality parameters 211 related to each of the plurality of channels 105 through a gateway 103 associated with each of the plurality of BTSs 107 (not shown in FIG. 4).

In an implementation, the communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® ICES®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOB- JECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method for dynamically allocating channels among a plurality of Base Transceiver Stations (BTSs) in a Long-Range Land-To-Sea (LRLS) wireless network.

In an embodiment, the method of present disclosure helps in eliminating interference in the channels connecting the BTSs and their respective Customer Premises Equipments (CPEs), thereby optimizing network throughput in a region.

In an embodiment, the method of present disclosure helps in mitigating "flapping" effect or "ping-ping" effect in the LRLS wireless network and thereby improves Quality of Experience (QoE) to end users.

In an embodiment, the present disclosure provides a robust, centralized channel allocation unit that coordinates region-wide channel capacity metrics and helps in identifying the optimal channel for each of the plurality of BTSs.

In an embodiment, the method of present disclosure is based on Signal-to-Interference Noise Ratio (SINK) and Modulation and Coding Scheme (MCS) of the channels, and hence the solution proposed by the present disclose is portable across different technologies, involving different wireless network devices.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Channel allocation unit |
| 103 | Gateway |
| 105 | Plurality of channels |
| 107 | Base Transceiver Stations (BTSs) |
| 109 | LRLS wireless network |
| 111 | Customer Premises Equipments |
| 201 | I/O interface |
| 203 | Processor |
| 205 | Memory |
| 207 | Data |
| 209 | Modules |
| 211 | Channel quality parameters |
| 213 | AWSINR metrics |
| 215 | Channel capacity metrics |
| 217 | Throughput value |
| 219 | Other data |
| 221 | Configuration module |
| 223 | Channel scanning module |
| 225 | Metrics computation module |
| 227 | Optimal channel identification module |
| 229 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |

| Reference Number | Description |
| --- | --- |
| 413 | RAM |
| 414 | ROM |

What is claimed is:

1. A method of dynamic channel allocation among a plurality of Base Transceiver Stations (BTSs) in a Long-Range Land-To-Sea (LRLS) wireless network, the method comprising:
 configuring, by a channel allocation unit, a plurality of channels, having non-overlapping frequencies, to the plurality of BTSs for communicating with one or more Customer Premises Equipments (CPEs);
 scanning, by the channel allocation unit, each of the plurality of channels corresponding to each pair of the BTS and the CPEs for obtaining one or more channel quality parameters related to each of the plurality of channels;
 computing, by the channel allocation unit, at least one of an Aggregate Weighted Signal-to-Interference Noise Ratio (AWSINR) metrics or channel capacity metrics for each pair of the BTS and the CPEs, across each of the plurality of channels, based on the one or more channel quality parameters;
 determining, by the channel allocation unit, a throughput value for the plurality of BTSs across each of the plurality of channels based on the channel capacity metrics of the corresponding channel; and
 identifying, by the channel allocation unit, an optimal channel, from the plurality of channels, for each of the plurality of BTSs based on at least one of the AWSINR metrics or the throughput value, wherein the identified optimal channel is allocated to respective each of the plurality of BTSs, and wherein the identified optimal channel eliminates interference at each of the plurality of BTSs.

2. The method as claimed in claim 1, wherein the one or more channel quality parameters comprise at least one of a downlink AWSINR of each of the plurality of channels, an uplink AWSINR of each of the plurality of channels, buffer size of the AWSINR metrics of each of the plurality of channels, downlink channel capacity of each of the plurality of channels, and uplink channel capacity of each of the plurality of channels.

3. The method as claimed in claim 1, wherein the AWSINR metrics is computed as a sum of downlink AWSINR and uplink AWSINR of each of the plurality of channels, normalized to buffer size of the AWSINR metrics of each of the plurality of channels.

4. The method as claimed in claim 1, wherein the channel capacity metrics is computed as a sum of downlink channel capacity and uplink channel capacity of each of the plurality of channels.

5. The method as claimed in claim 1, wherein the AWSINR metrics and the channel capacity metrics are computed at predetermined regular intervals based on the one or more channel quality parameters obtained at the predetermined regular intervals.

6. The method as claimed in claim 1, wherein the throughput is determined by computing the combined channel capacity of each of the plurality of channels.

7. The method as claimed in claim 1, wherein identifying the optimal channel for each of the plurality of BTSs comprises:
 ranking each of the plurality of BTSs and corresponding plurality of channels based on at least one of the AWSINR or the throughput value; and
 identifying one of the plurality of channels, having highest rank, as the optimal channel for the respective each of the plurality of BTSs.

8. A channel allocation unit for performing dynamic channel allocation among a plurality of Base Transceiver Stations (BTSs) in a Long-Range Land-To-Sea (LRLS) wireless network, the channel allocation unit comprising:
 a processor; and
 a memory, communicatively coupled to the processor, wherein the memory stores processor-executable instructions, which on execution, cause the processor to:
  configure a plurality of channels, having non-overlapping frequencies, to the plurality of BTSs to communicate with one or more Customer Premises Equipments (CPEs);
  scan each of the plurality of channels corresponding to each pair of the BTS and the CPEs to obtain one or more channel quality parameters related to each of the plurality of channels;
  compute at least one of an Aggregate Weighted Signal-to-Interference Noise Ratio (AWSINR) metrics or the channel capacity metrics for each pair of the BTS and the CPEs, across each of the plurality of channels, based on the one or more channel quality parameters;
  determine a throughput value for the plurality of BTSs across each of the plurality of channels based on the channel capacity metrics of the corresponding channel; and
  identify an optimal channel, from the plurality of channels, for each of the plurality of BTSs based on at least one of the AWSINR metrics or the throughput value, wherein the identified optimal channel is allocated to respective each of the plurality of BTSs and wherein the identified optimal channel eliminates interference at each of the plurality of BTSs.

9. The channel allocation unit as claimed in claim 8, wherein the one or more channel quality parameters comprise at least one of a downlink AWSINR of each of the plurality of channels, an uplink AWSINR of each of the plurality of channels, buffer size of the AWSINR metrics of each of the plurality of channels, downlink channel capacity of each of the plurality of channels, and uplink channel capacity of each of the plurality of channels.

10. The channel allocation unit as claimed in claim 8, wherein the processor computes the AWSINR metrics as a sum of downlink AWSINR and uplink AWSINR of each of the plurality of channels, normalized to buffer size of the AWSINR metrics of each of the plurality of channels.

11. The channel allocation unit as claimed in claim 8, wherein the processor computes the channel capacity metrics as a sum of downlink channel capacity and uplink channel capacity of each of the plurality of channels.

12. The channel allocation unit as claimed in claim 8, wherein the processor computes the AWSINR metrics and the channel capacity metrics at predetermined regular intervals based on the one or more channel quality parameters obtained at the predetermined regular intervals.

13. The channel allocation unit as claimed in claim 8, wherein the processor determines the throughput by computing the combined channel capacity of each of the plurality of channels.

14. The channel allocation unit as claimed in claim 8, wherein to identify the optimal channel for each of the plurality of BTSs, the processor is configured to:
- rank each of the plurality of BTSs and corresponding plurality of channels based on at least one of the AWSINR or the throughput value (217); and
- identify one of the plurality of channels, having highest rank, as the optimal channel for the respective each of the plurality of BTSs.

15. A non-transitory computer readable medium including instructions stored thereon that when processed by at least one processor cause a channel allocation unit to perform operations comprising:
- configuring a plurality of channels having non-overlapping frequencies to the plurality of BTSs for communicating with one or more Customer Premises Equipments (CPEs);
- scanning each of the plurality of channels corresponding to each pair of the BTS and the CPEs for obtaining one or more channel quality parameters related to each of the plurality of channels;
- computing at least one of an Aggregate Weighted Signal-to-Interference Noise Ratio (AWSINR) metrics or channel capacity metrics for each pair of the BTS and the CPEs, across each of the plurality of channels, based on the one or more channel quality parameters;
- determining a throughput value for the plurality of BTSs across each of the plurality of channels based on the channel capacity metrics of the corresponding channel; and
- identifying an optimal channel, from the plurality of channels, for each of the plurality of BTSs based on at least one of the AWSINR metrics or the throughput value, wherein the identified optimal channel is allocated to respective each of the plurality of BTSs and wherein the identified optimal channel eliminates interference at each of the plurality of BTSs.

* * * * *